(12) United States Patent
He et al.

(10) Patent No.: US 12,555,170 B2
(45) Date of Patent: Feb. 17, 2026

(54) TRANSFORMER STATE EVALUATION METHOD BASED ON ECHO STATE NETWORK AND DEEP RESIDUAL NEURAL NETWORK

(71) Applicant: WUHAN UNIVERSITY, Wuhan (CN)

(72) Inventors: Yigang He, Wuhan (CN); Zhikai Xing, Wuhan (CN); Xiao Wang, Wuhan (CN); Liulu He, Wuhan (CN); Chuankun Wang, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 726 days.

(21) Appl. No.: 18/045,468

(22) Filed: Oct. 11, 2022

(65) Prior Publication Data

US 2023/0112749 A1    Apr. 13, 2023

(30) Foreign Application Priority Data

Oct. 12, 2021    (CN) .......................... 202111184970.8

(51) Int. Cl.
  *G06Q 50/06*    (2024.01)
  *G01D 21/02*    (2006.01)

(52) U.S. Cl.
  CPC ............. *G06Q 50/06* (2013.01); *G01D 21/02* (2013.01)

(58) Field of Classification Search
  CPC ........ G01D 21/02; G06F 30/20; G06N 3/045; G06N 3/08; G06Q 50/06; Y04S 10/50
  See application file for complete search history.

(56) References Cited

U.S. PATENT DOCUMENTS

| | | | |
|---|---|---|---|
| 10,803,881 B1 | 10/2020 | Fazeli et al. | |
| 11,257,191 B2 | 2/2022 | Litwiller et al. | |
| 11,393,487 B2 | 7/2022 | Fazeli et al. | |
| 2015/0127277 A1* | 5/2015 | Desai | G01N 33/26 702/58 |
| 2017/0308800 A1* | 10/2017 | Cichon | G06N 20/00 |
| 2021/0081779 A1* | 3/2021 | Kanazawa | G06F 18/2415 |
| 2022/0318992 A1* | 10/2022 | Huang | G06T 7/0012 |
| 2023/0018893 A1* | 1/2023 | Kim | G06N 3/0895 |
| 2023/0045548 A1* | 2/2023 | Yakut | G06N 3/063 |

FOREIGN PATENT DOCUMENTS

| | | |
|---|---|---|
| CN | 112614343 A | 4/2021 |
| CN | 113452026 A | 9/2021 |
| CN | 115017683 A | 9/2022 |

* cited by examiner

*Primary Examiner* — Larry T Mackall

(57) ABSTRACT

A transformer health state evaluation method based on a leaky-integrator echo state network includes the following steps: collecting monitoring information in each substation; performing data filtering, data cleaning and data normalization on the collected monitoring information to obtain an input matrix; inputting the input matrix into a leaky-integrator echo state network to generate trainable artificial data, and dividing the artificial data into a training set and a test set in proportion; constructing a deep residual neural network based on a squeeze-and-excitation network, and inputting the training set and the test set for network training; and performing health state evaluation and network weight update based on actual test data. Considering that a deep learning-based neural network needs a large amount of data, the present disclosure uses the leaky-integrator echo state network to generate the artificial training data.

7 Claims, 4 Drawing Sheets

TRANSFORMER STATE EVALUATION METHOD BASED ON ECHO STATE NETWORK AND DEEP RESIDUAL NEURAL NETWORK

CROSS-REFERENCE TO RELATED APPLICATIONS

This application claims priority to Chinese Patent Application No. 202111184970.8 with a filing date of Oct. 12, 2021. The content of the aforementioned application, including any intervening amendments thereto, is incorporated herein by reference.

TECHNICAL FIELD

The present disclosure relates to the technical field of health state evaluation of transformers, and in particular, to a transformer health state evaluation method based on a leaky-integrator echo state network and a deep residual neural network.

BACKGROUND

As electrical equipment for converting electric energy in a power system, a power transformer is a key part for safe and stable operation of a power grid. After years of operation, the transformer has various potential risks, such as insulation aging and component loosening, which increases a probability of a fault. Therefore, it is of great significance to evaluate a health state of the transformer. Online health state evaluation of a high-voltage and large-capacity power transformer by using advanced technologies such as artificial intelligence and data cleaning is crucial for the guidance in operation and maintenance of the transformer.

The health state can reflect an operation state of the transformer based on collected information. A traditional health state evaluation method requires many test parameters to evaluate a state of the transformer. In addition, some test parameters are not defined hierarchically, which makes this method unable to play its advantages in practical application. With the development of a deep learning-based neural network, a residual network, a leaky-integrator echo state network, a squeeze-and-excitation network, and other algorithms are applied to health state evaluation. However, due to poor quality of training data, an insufficient learning ability, a poor feature extraction effect, and other reasons, the above methods have certain limitations when applied in health state evaluation of the power transformer. In recent years, the deep learning theory has been gradually improved, and an improved deep learning model has higher accuracy. As a special recurrent neural network, the leaky-integrator echo state network has a simple structure and high prediction accuracy. The leaky-integrator echo state network can generate high-quality data, which can be used by a deep learning network for training. With a simple structure, the squeeze-and-excitation network mainly focuses on a relationship between network channels, such that a more lightweight model is achieved and an amount of calculation is reduced. In this way, the deep learning-based neural network has good accuracy in the field of health state evaluation.

SUMMARY

The technical issue to be resolved in the present disclosure is to provide a transformer health state evaluation method based on a leaky-integrator echo state network and a deep residual neural network, so as to overcome prior-art defects of relying too much on selection of various variable parameters, being unable to evaluate a health state in the case of a plurality of variables, and the like. The evaluation method achieves higher evaluation efficiency and accuracy.

The present disclosure resolves the technical issue with the following technical solution:

The present disclosure provides a transformer health state evaluation method based on a leaky-integrator echo state network and a deep residual neural network, including the following steps:

step 1: collecting monitoring information in each substation, including monitoring information of an oil test and contents of dissolved gas and furan in oil in each substation;

step 2: performing data filtering, data cleaning and data normalization on the collected monitoring information to obtain an input matrix;

step 3: inputting the input matrix into a leaky-integrator echo state network to generate trainable artificial data, and dividing the artificial data into a training set and a test set in proportion;

step 4: constructing a deep residual neural network based on a squeeze-and-excitation network, and inputting the training set and the test set for network training; and step 5: performing health state evaluation and network weight update based on actual test data.

Further, the monitoring information collected in step 1 in the present disclosure is specifically records of test ledgers of a transformer and an electric power company during operation, wherein each group of data comprises contents of nine key states: a breakdown voltage (BDV), water, acidity, hydrogen, methane, ethane, ethylene, acetylene, and furan, and a health state of the corresponding transformer.

Further, step 2 in the present disclosure specifically includes:

performing moving average filtering on the data collected in step 1 to eliminate noise in the data, where an expression of a moving average filter is as follows:

$$Y(t) = \frac{1}{T_w} \int_{t-T_w}^{t} y(t)dt$$

wherein $Y(t)$ represents an output of the filter, $y(t)$ represents an input of the filter, $t$ represents a length of input data, and $T_w$ represents a length of a moving window, and a value of $T_w$ determines filtering performance;

then performing data cleaning, including error correction, duplicate deletion, specification unification, logic correction, structure conversion, data compression, incomplete/null value supplementation, and data/variable discarding to ensure data consistency; and finally normalizing processed data by a range transformation method according to the following formula:

$$y_i = \frac{x_i - \min(x)}{\max(x) - \min(x)}$$

wherein $\max(x)$ represents a maximum value of sample data, $\min(x)$ represents a minimum value of the sample data, $x_i$ represents an $i^{th}$ piece of data in a sample, and $y_i$ represents an $i^{th}$ piece of normalized data.

Further, step 3 in the present disclosure specifically includes:

performing model establishment and algorithm training to obtain a model of the leaky-integrator echo state network, specifically including:

establishing the leaky-integrator echo state network, where a state equation is as follows:

$$x(t+1)=(1-\gamma)x(t)+\gamma f(W^{in}u(t+1)+W^{res}x(t)+W^{back}y(t))$$

wherein $W^{in}$ represents an input weight matrix, $W^{res}$ represents a weight matrix of a reservoir state, $W^{back}$ represents a weight matrix of an output to the reservoir state, $\gamma$ represents a leakage rate, t represents time, x(t) represents a previous state of a storage pool, $f(\cdot)$ represents an activation function of a neuron, u(t+1) represents an input layer, and x(t+1) represents a next state of the storage pool; and an output equation of the network is as follows:

$$y(t)=g(W^{out}[x(n);u(n)])$$

wherein $W^{out}$ represents an output weight matrix of the network, and $g(\cdot)$ represents an activation function of an output layer;

training the established leaky-integrator echo state network, wherein in a training process, a least-square method is used to dynamically adjust a weight of the leaky-integrator echo state network, and an L1 norm constraint is added to an objective function of the least-square method according to the following formula:

$$G(n) = \frac{1}{2}\sum_{m=0}^{n}\lambda^{n-m}|e(m)|^2 + \gamma\|W^{out}(n)\|_1$$

wherein $\lambda$ represents a forgetting factor at time n, e(m) represents an error signal, and $\gamma$ represents a regularization parameter; and finally, obtaining the leaky-integrator echo state network based on a network weight obtained through training; and inputting original data to the leaky-integrator echo state network to obtain the generated data.

Further, in step 3 in the present disclosure, the artificial data is divided into two parts, where 80% of the artificial data is used as the training set to train the deep residual neural network, and 20% of the artificial data is used as the test set to verify an effect of transformer health state evaluation performed by the network.

Further, step 4 in the present disclosure specifically includes:

constructing a residual module, including a normalization layer, a fully connected layer, a squeeze-and-excitation layer, and a threshold layer, where the residual module is composed of eight layers of networks, where a first layer is the normalization layer configured to normalize the data using a regularization method, where a data dimension of this layer is m×n×l; and a regularization formula is as follows:

$$\vec{x_i} = \frac{x_i - \mu_B}{\sqrt{\sigma_B^2 + \varepsilon}}$$

wherein $\mu_B$ represents an average value of the data, $\sigma_B^2$ represents a variance of the data, $x_i$ represents input data, $\vec{x_i}$ represents output data, and $\varepsilon$ represents a parameter;

in the regularization formula, the average value of the data is calculated according to the following formula:

$$\mu_B = \frac{1}{m}\sum_{i=1}^{m}x_i$$

in the regularization formula, the variance of the data is calculated according to the following formula:

$$\sigma_B^2 = \frac{1}{m}\sum_{i=1}^{m}(x_i - \mu_B)^2$$

in the normalization layer, after all the data is regularized, the data is changed such that the network can learn a rule of regularization, and a corresponding formula is as follows:

$$y_i=\gamma x_i+\beta$$

wherein $\gamma$ and $\beta$ represent parameters learned by the neural network;

a second layer is a global average pooling layer configured to reduce a dimension of the data in transmission and reduce network training parameters, where a data dimension of this layer is m×n×l, and a calculation formula is as follows:

$$z_l = \frac{1}{M \times N}\sum_{i=1}^{M}\sum_{j=1}^{M}u(i, j)$$

wherein u(i, j) represents input data, M and N represent data dimensions, and $z_l$ represents output data;

a third layer is an excitation layer configured to capture a dependency between channels, where a data dimension of this layer is m×n×(l/n), and a calculation formula is as follows:

$$s_l=\sigma(W_2\delta(W_1z))$$

wherein $\delta$ represents a ReLU activation function, $$W_1 \in R^{\frac{1}{b} \times 1}, \text{ and } W_2 \in R^{1 \times \frac{1}{b}};$$

a fourth layer is an activation layer, where a data dimension of this layer is m×n×(l/n), and a corresponding formula is as follows:

$$x_l=F_{scale}(u_l,s_l)=s_l u_l$$

wherein $x=[x_1, x_2, \ldots, x_l]$, and $F_{scale}(u_l, s_l)$ represents calculation of a product of $s_l$ and input data;

a fifth layer is the excitation layer, where a data dimension of this layer is m×n×l;

a sixth layer is an activation function layer, where 'sigmoid' is used as an activation function, and a data dimension of this layer is m×n×l;

a seventh layer is a soft threshold layer, where $\alpha$ is calculated according to the following formula, and then multiplied by data output from the first layer;

$$\alpha = \frac{1}{1+e^{-z}}$$

wherein z represents data output from the sixth layer; and
an eighth layer is an additive layer configured to add data output from the seventh layer and the data input into the first layer; and
forming the deep residual neural network by an input layer, a residual layer, a softmax layer, and a classification output layer, where a specific training process of the neural network is as follows: using a cross entropy as an error function, using data generated by the leaky-integrator echo state network as training data of the neural network, and using an Adam optimization algorithm to update a weight of the deep residual neural network, where in a process of using the Adam optimization algorithm to update the weight of the deep residual neural network, if an average value within a range of consecutive specified steps is less than a specified threshold, training of the neural network is stopped and a weight that is of the deep residual neural network and calculated in the step 5 is saved;
a formula of a cross entropy function used in the training process is as follows:

$$E = -\sum_{j=1}^{N_{class}} t_j \log(y_i)$$

wherein $t_j$ represents an actual probability that an observation result belongs to category j, and $N_{class}$ represents a total quantity of classification results; and
a formula of the Adam optimization algorithm in the training process is as follows:

$$x^{n+1} = x^n - \frac{\alpha}{\sqrt{\hat{v}_n + \varepsilon}} \hat{m}_n$$
$$\hat{v}_n = \frac{v_n}{1 - \beta_2^n}$$
$$\hat{m}_n = \frac{m_n}{1 - \beta_1^n}$$
$$v_n = \beta_2 v_{n-1} + (1 - \beta_2) g_n^2$$
$$m_n = \beta_1 m_{n-1} + (1 - \beta_1) g_n$$

wherein $\beta_1$ and $\beta_2$ represent two hyper-parameters, $\varepsilon$ represents an auxiliary constant to prevent an update collapse, $g_n$ represents a gradient of the error function, and $g_n^2$ represents a second momentum of $g_n$.
Further, step 5 in the present disclosure specifically includes:
performing data filtering and data cleaning on the data according to step 2, then generating an artificial data set according to step 3, and finally performing health state evaluation based on the test set in step 4, where if a new data category or a relevant influencing factor needs to be added, the original network is used as a pre-training model to activate all layers for training.
The present disclosure has the following beneficial effects: Considering that there are many parameters and evaluation accuracy is low in typical transformer health state evaluation, the transformer health state evaluation method based on a leaky-integrator echo state network and a deep residual neural network in the present disclosure uses the deep residual neural network to perform health state evaluation. Considering that the deep residual neural network is characterized by a large number of parameters and complex training, the present disclosure creatively constructs a health evaluation model of the deep residual neural network based on the squeeze-and-excitation network. On this basis, considering that noise and abnormal data exist in actual engineering data, this specification filters and cleans input data of the model. The artificial data generated by the leaky-integrator echo state network is used for training, which improves quality of the training data set and improves accuracy and applicability of the health state evaluation method in the present disclosure.

BRIEF DESCRIPTION OF THE DRAWINGS

The present disclosure is described in further detail with reference to the accompanying drawings and embodiments.

DETAILED DESCRIPTION OF THE EMBODIMENTS

Figure 1:
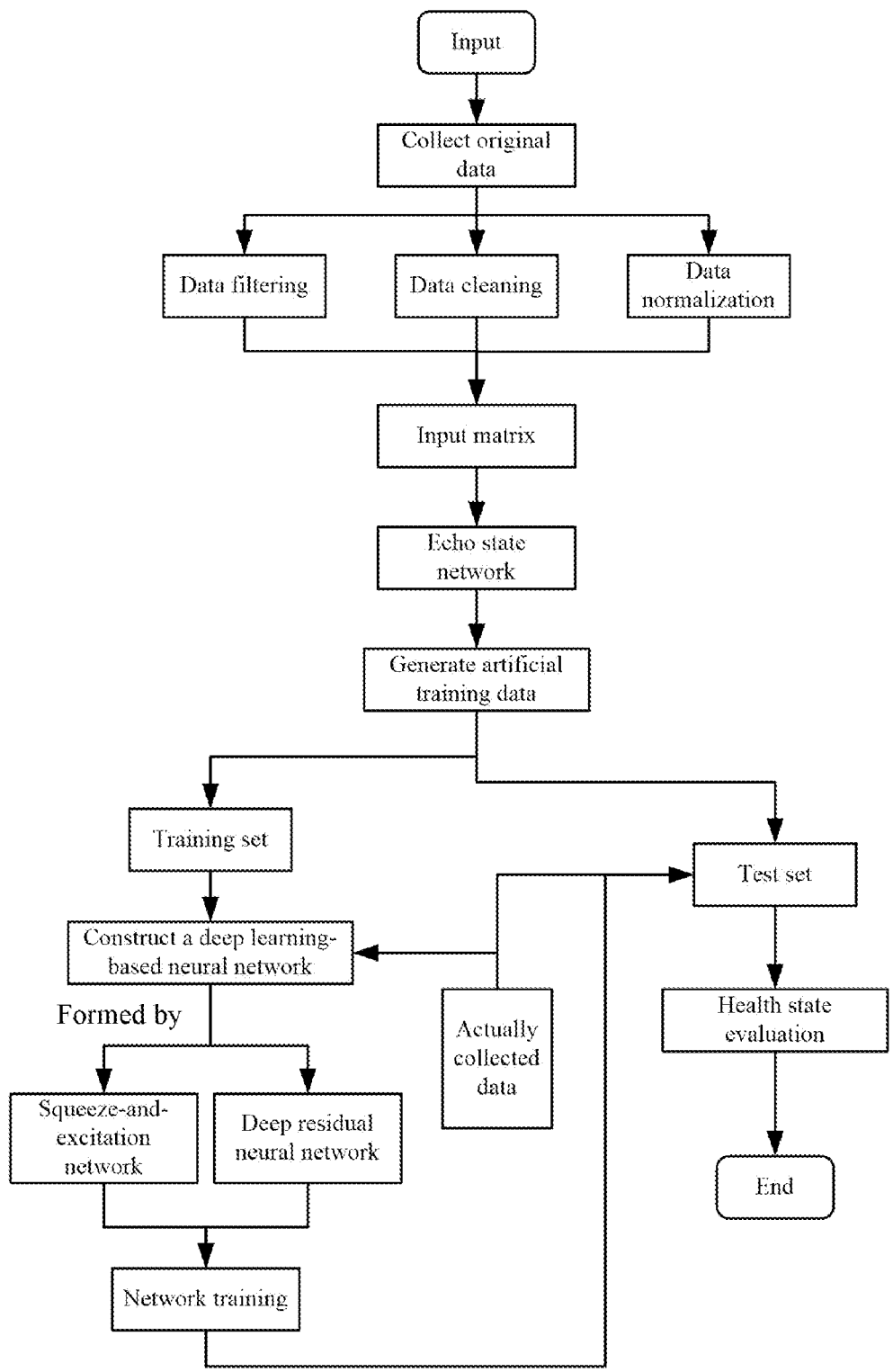
FIG. 1 is a flowchart of implementing a transformer health state evaluation method based on a leaky-integrator echo state network and a deep residual neural network according to an embodiment of the present disclosure.

To make the objectives, technical solutions, and advantages of the present disclosure clearer, the present disclosure is further described below in detail with reference to the accompanying drawings and embodiments. It should be understood that the specific embodiments described herein are merely intended to explain the present disclosure, rather than to limit the present disclosure.
The present disclosure is intended to provide a new evaluation method for a health state of a transformer, to achieve higher evaluation efficiency and accuracy and resolve a problem that a traditional method relies too much on selection of variable parameters and cannot evaluate the health state in the case of a plurality of variables.
The present disclosure is implemented by the following technical solutions.
As shown in FIG. 1, a transformer health state evaluation method based on a leaky-integrator echo state network and a deep residual neural network according to an embodiment of the present disclosure includes the following steps.
Step 1: Collect monitoring information of an oil test and contents of dissolved gas and furan in oil in each substation.
The data in step 1 is collected from records of test ledgers of a transformer and an electric power company during operation, where each group of data includes contents of nine key states: a BDV, water, acidity, hydrogen (H2), methane (CH4), ethane (C2H6), ethylene (C2H4), acetylene (C2H2), and furan, and a health state of the corresponding transformer.
Step 2: Perform data filtering, data cleaning and data normalization on the collected monitoring information to obtain an input matrix.
With reference to DL/T 1685-2017 *Guide for Condition Evaluation of Oil Immersed Power Transformers*, this embodiment classifies the transformer state into the following four levels: normal, cautionary, abnormal, and severe, as shown in Table 1.

TABLE 1

Corresponding relationship between an evaluation level and a relative deterioration degree and corresponding state description

| Relative deterioration degree | Corresponding state | State description | Sample quantity |
|---|---|---|---|
| 0.0-0.2 | Normal | Each index is stable and within a standard limit. The transformer can operate normally. | 217 |
| 0.2-0.5 | Cautionary | The index is developing towards the limit. The transformer can continue to operate, but needs to be monitored and overhauled normally as planned. | 139 |
| 0.5-0.8 | Abnormal | The index varies greatly, approaching or slightly exceeding the standard limit. Power-outage overhaul shall be properly arranged. | 103 |
| 0.8-1.0 | Severe | One or more indexes seriously exceed the standard limit. Power-outage overhaul must be arranged as soon as possible. | 72 |

Different transformers have unequal health state data samples. Sample data needs to be generated.

Step 3: Input the input matrix into a leaky-integrator echo state network to generate trainable artificial data, and divide the artificial data into a training set and a test set in proportion.

Figure 2:
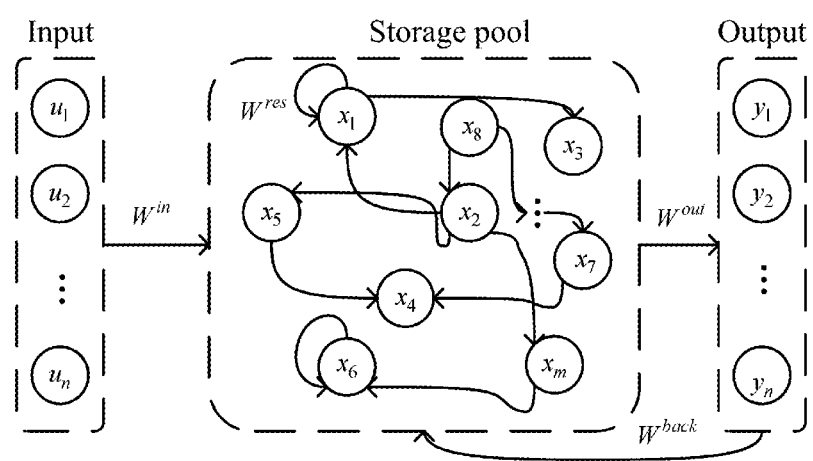
FIG. 2 shows a structure of leaky-integrator echo state network according to an embodiment of the present disclosure.

A model of the leaky-integrator echo state network is shown in FIG. 2. The leaky-integrator echo state network generates the artificial data according to the following formula:

$$y(t)=g(W^{out}[x(n);u(n)])$$

Then, artificial data generated according to a formula x(t+1) is input into a deep residual neural network for training. A data set is divided into two parts, where 80% of the data set is used as the training set to train the deep residual neural network, and 20% of the data set is used as the test set to verify an effect of classifying the heath state by the network.

Step 4: Construct a deep residual neural network based on a squeeze-and-excitation network, and input the training set and the test set for network training.

Figure 3:
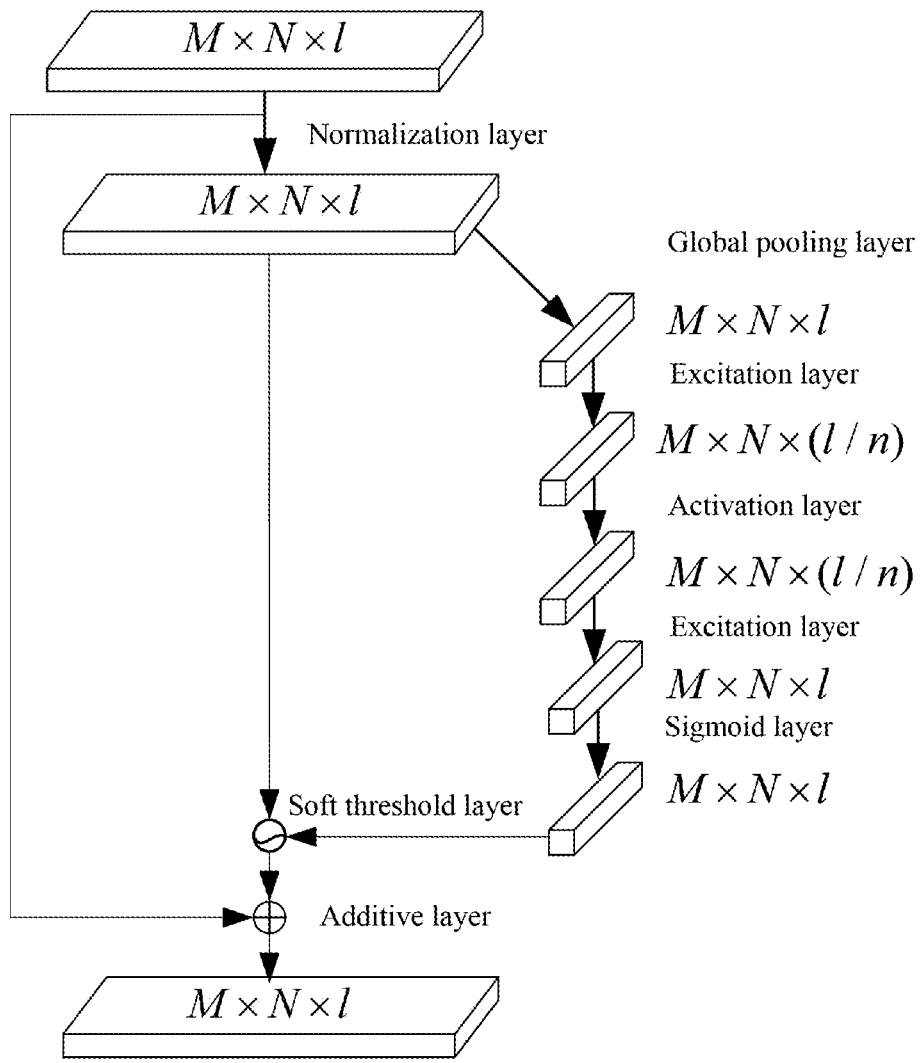
FIG. 3 shows a structure of a residual module according to an embodiment of the present disclosure.
Figure 4:
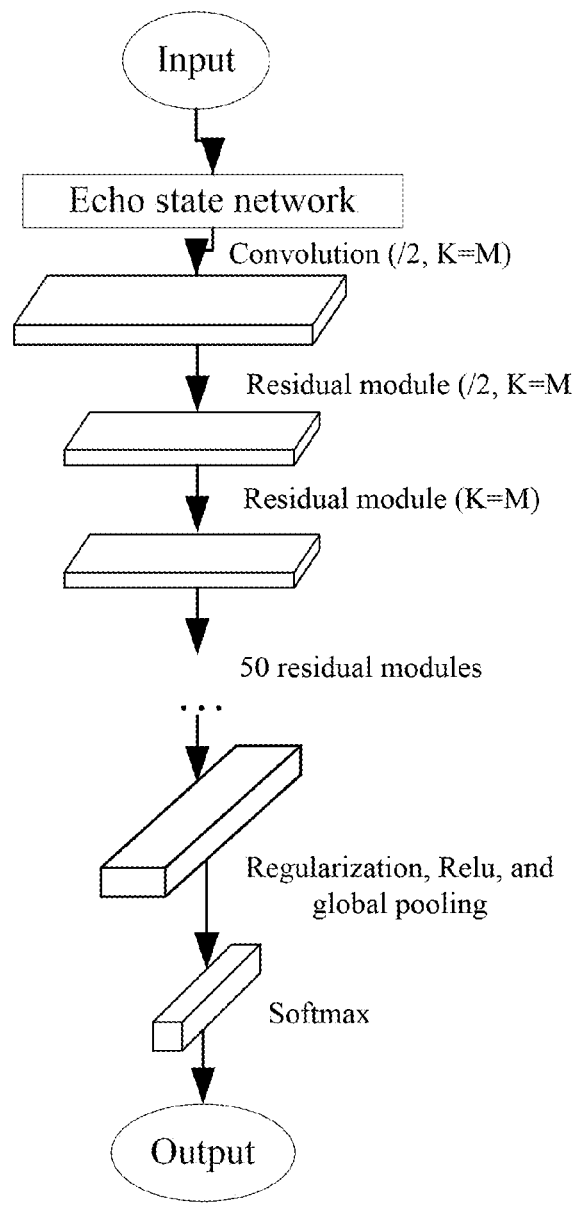
FIG. 4 shows a structure of a model based on a leaky-integrator echo state network and a deep residual neural network according to an embodiment of the present disclosure.

The improved deep residual neural network in step 4 is constructed as follows: first, building a residual module, where a residual layer is composed of 50 residual modules, as shown in FIG. 3, and the residual module includes a normalization layer, a regularization layer, a fully connected layer, a squeeze-and-excitation layer, and a threshold layer; and then, forming a model by an input layer, the residual layer, a softmax layer, and a classification output layer. FIG. 4 shows a structure of the deep residual neural network, and a gate activation function of the deep residual neural network is $\sigma$. In the present disclosure, an activation function is 'sigmoid', and a state activation function is 'tanh'.

In step 4, the constructed deep residual neural network is trained by using the input training set and test set.

Hyper-parameter settings of the network are shown in Table 2. After that, the deep residual neural network is trained and verified according to step 4 in the implementation to obtain a health state evaluation model.

TABLE 2

Hyper-parameter settings of the deep residual neural network

| Item | Value |
|---|---|
| Optimizer | Adam |
| Initial learning rate | 0.01 |
| Residual module | 50 |
| Minibatchsize | 28 |
| Maxepoch | 1000 |

For simplicity, the following formula is used to calculate an accuracy rate. In practical application, an output result of the softmax layer can also be comprehensively considered. Each group of data corresponds to a probability of each transformer state label. A type corresponding to a maximum probability can be selected as a diagnosis result. In addition, when there is no significant difference between the second largest probability and the maximum probability in the softmax layer, the two diagnosis results can be comprehensively considered.

$$Acc = \frac{TP + TN}{TP + TN + FP + FN}$$

In the above formula, TP represents a quantity of positive categories that are predicted as positive categories, TN represents a quantity of negative categories that are predicted as negative categories, FP represents a quantity of negative categories that are predicted as positive categories, and FN represents a quantity of positive categories that are predicted as negative categories.

Step 5: Perform health state evaluation and network weight update based on actual test data. The data set, obtained through monitoring, of the transformer is input for health evaluation. A final diagnosis accuracy rate is 93.4511%. Some evaluation results are selected, as shown in Table 3.

TABLE 3

Some fault diagnosis results based on the deep residual neural network

| Evaluation result | Actual health state | Normal | Cautionary | Abnormal | Severe |
|---|---|---|---|---|---|
| Normal | Normal | 99.47% | 0.08% | 0.08% | 0.37% |
| Cautionary | Cautionary | 0.05% | 99.46% | 0.00% | 0.50% |
| Abnormal | Abnormal | 0.06% | 0.05% | 98.99% | 0.90% |
| Normal | Normal | 99.62% | 0.06% | 0.03% | 0.29% |
| Severe | Severe | 0.03% | 0.00% | 0.22% | 99.75% |
| Normal | Normal | 98.86% | 0.06% | 0.09% | 1.00% |
| Abnormal | Abnormal | 0.05% | 0.08% | 98.99% | 0.88% |
| Abnormal | Abnormal | 0.10% | 0.05% | 98.81% | 1.04% |
| Normal | Normal | 99.62% | 0.08% | 0.09% | 0.21% |
| Severe | Severe | 0.07% | 0.07% | 0.44% | 99.42% |
| Abnormal | Abnormal | 0.10% | 0.03% | 99.00% | 0.87% |
| Severe | Severe | 0.01% | 0.01% | 0.98% | 99.01% |
| Abnormal | Abnormal | 0.00% | 0.01% | 98.85% | 1.14% |
| Severe | Severe | 0.00% | 0.00% | 0.00% | 100.00% |
| Normal | Normal | 99.35% | 0.05% | 0.04% | 0.56% |
| Abnormal | Abnormal | 0.05% | 0.91% | 98.95% | 0.08% |
| Normal | Normal | 99.29% | 0.09% | 0.04% | 0.58% |
| Cautionary | Cautionary | 0.70% | 99.20% | 0.05% | 0.06% |
| Severe | Cautionary | 0.06% | 0.07% | 0.64% | 99.23% |
| Abnormal | Abnormal | 0.02% | 0.26% | 99.66% | 0.06% |
| Cautionary | Cautionary | 0.22% | 99.64% | 0.05% | 0.09% |
| Cautionary | Normal | 0.68% | 99.18% | 0.09% | 0.05% |
| Severe | Severe | 0.10% | 0.00% | 0.52% | 99.38% |
| Cautionary | Cautionary | 0.00% | 100.00% | 0.00% | 0.00% |
| Severe | Severe | 0.09% | 0.01% | 0.54% | 99.37% |
| Cautionary | Cautionary | 0.20% | 99.70% | 0.01% | 0.09% |
| Severe | Severe | 0.02% | 0.01% | 1.00% | 98.97% |

The performing health state evaluation and network weight update based on actual test data in step 5 includes: for real-time monitoring data, performing data filtering and data cleaning according to step 2, then generating an artificial data set according to step 3, and finally performing health state evaluation based on the test set in step 4. If a new variable or a relevant influencing factor needs to be added, the original neural network is used as a pre-training model to activate all the layers for training.

It should be understood that those of ordinary skill in the art can make improvements or transformations based on the above description, and all these improvements and transformations should fall within the protection scope of the appended claims of the present disclosure.

What is claimed is:

1. A transformer health state evaluation method based on a leaky-integrator echo state network and a deep residual neural network, comprising the following steps:
   step 1: collecting monitoring information in each substation, comprising monitoring information of an oil test and contents of dissolved gas and furan in oil in each substation;
   step 2: performing data filtering, data cleaning and data normalization on the collected monitoring information to obtain an input matrix;
   step 3: inputting the input matrix into a leaky-integrator echo state network to generate trainable artificial data, and dividing the artificial data into a training set and a test set in proportion;
   step 4: constructing a deep residual neural network based on a squeeze-and-excitation network, and inputting the training set and the test set for network training; and
   step 5: performing health state evaluation and network weight update based on actual test data.

2. The transformer health state evaluation method according to claim 1, wherein the monitoring information collected in step 1 is specifically records of test ledgers of a transformer and an electric power company during operation, wherein each group of data comprises contents of nine key states: a breakdown voltage (BDV), water, acidity, hydrogen, methane, ethane, ethylene, acetylene, and furan, and a health state of the corresponding transformer.

3. The transformer health state evaluation method according to claim 1, wherein step 2 specifically comprises:
   performing moving average filtering on the data collected in step 1 to eliminate noise in the data, wherein an expression of a moving average filter is as follows:

$$Y(t) = \frac{1}{T_w} \int_{t-T_w}^{t} y(t)dt$$

wherein $Y(t)$ represents an output of the filter, $y(t)$ represents an input of the filter, t represents a length of input data, and $T_w$ represents a length of a moving window, and a value of $T_w$ determines filtering performance;
   then performing data cleaning, comprising error correction, duplicate deletion, specification unification, logic correction, structure conversion, data compression, incomplete/null value supplementation, and data/variable discarding to ensure data consistency; and
   finally normalizing processed data by a range transformation method according to the following formula:

$$y_i = \frac{x_i - \min(x)}{\max(x) - \min(x)}$$

wherein $\max(x)$ represents a maximum value of sample data, $\min(x)$ represents a minimum value of the sample data, $x_i$ represents an ith piece of data in a sample, and $y_i$ represents an ith piece of normalized data, x is an integer greater than or equal to 1.

4. The transformer health state evaluation method according to claim 1, wherein step 3 specifically comprises:
   performing model establishment and algorithm training to obtain a model of the leaky-integrator echo state network, specifically comprising:
   establishing the leaky-integrator echo state network, wherein a state equation is as follows:

$$x(t+1)=(1-\gamma)x(t)+\gamma f(W^{in}u(t+1)+W^{res}x(t)+W^{back}y(t))$$

wherein $W^{in}$ represents an input weight matrix, $W^{res}$ represents a weight matrix of a reservoir state, $W^{back}$ represents a weight matrix of an output to the reservoir state, $\gamma$ represents a leakage rate, t represents time, $x(t)$ represents a previous state of a storage pool, $f(\bullet)$ represents an activation function of a neuron, $u(t+1)$ represents an input layer, and $x(t+1)$ represents a next state of the storage pool, x is an integer greater than or equal to 1; and
   an output equation of the network is as follows:

$$y(t)=g(W^{out}[x(n);u(n)])$$

wherein $W^{out}$ represents an output weight matrix of the network, and $g(\bullet)$ represents an activation function of an output layer;
   training the established leaky-integrator echo state network, wherein
   in a training process, a least-square method is used to dynamically adjust a weight of the leaky-integrator echo state network, and an L1 norm constraint is added to an objective function of the least-square method according to the following formula:

$$G(n) = \frac{1}{2}\sum_{m=0}^{n} \lambda^{n-m}|e(m)|^2 + \gamma \|W^{out}(n)\|_1$$

wherein λ represents a forgetting factor at time n, e(m) represents an error signal, and γ represents a regularization parameter; and finally, obtaining the leaky-integrator echo state network based on a network weight obtained through training; and inputting original data to the leaky-integrator echo state network to obtain the generated data.

5. The transformer health state evaluation method according to claim 1, wherein in step 3, the artificial data is divided into two parts, wherein 80% of the artificial data is used as the training set to train the deep residual neural network, and 20% of the artificial data is used as the test set to verify an effect of transformer health state evaluation performed by the network.

6. The transformer health state evaluation method according to claim 1, wherein step 4 specifically comprises:
constructing a residual module, comprising a normalization layer, a fully connected layer, a squeeze-and-excitation layer, and a threshold layer, wherein the residual module is composed of eight layers of networks, wherein
a first layer is the normalization layer configured to normalize the data using a regularization method, wherein a data dimension of this layer is m×n×l; and a regularization formula is as follows:

$$\vec{x}_i = \frac{x_i - \mu_B}{\sqrt{\sigma_B^2 + \varepsilon}}$$

wherein $\mu_B$ represents an average value of the data, $\sigma_B^2$ represents a variance of the data, $x_i$ represents input data, $\vec{x}_i$ represents output data, and ε represents a parameter;

in the regularization formula, the average value of the data is calculated according to the following formula:

$$\mu_B = \frac{1}{m}\sum_{i=1}^{m} x_i$$

in the regularization formula, the variance of the data is calculated according to the following formula:

$$\sigma_B^2 = \frac{1}{m}\sum_{i=1}^{m}(x_i - \mu_B)^2$$

in the normalization layer, after all the data is regularized, the data is changed such that the network can learn a rule of regularization, and a corresponding formula is as follows:

$$y_i = \gamma x_i + \beta$$

wherein γ and β represent parameters learned by the neural network;

a second layer is a global average pooling layer configured to reduce a dimension of the data in transmission and reduce network training parameters, wherein a data dimension of this layer is m×n×l, and a calculation formula is as follows:

$$z_l = \frac{1}{M \times N}\sum_{i=1}^{M}\sum_{j=1}^{N} u(i, j)$$

wherein u(i, j) represents input data, M and N represent data dimensions, and $z_l$ represents output data;

a third layer is an excitation layer configured to capture a dependency between channels, wherein a data dimension of this layer is m×n×(l/n), and a calculation formula is as follows:

$$s_l = \delta(W_2 \delta(W_1 z))$$

wherein δ represents a ReLU activation function, $$W_1 \in R^{\frac{l}{b} \times l}, \text{ and } W_2 \in R^{l \times \frac{l}{b}};$$

a fourth layer is an activation layer, wherein a data dimension of this layer is m×n×(l/n), and a corresponding formula is as follows:

$$x_l = F_{scale}(u_l, s_l) = s_l u_l$$

wherein x=[$x_1$, $x_2$, ..., $x_l$], and $F_{scale}(u_l, s_l)$ represents calculation of a product of $s_l$ and input data, x is an integer greater than or equal to 1;

a fifth layer is the excitation layer, wherein a data dimension of this layer is m×n×l;

a sixth layer is an activation function layer, wherein 'sigmoid' is used as an activation function, and a data dimension of this layer is m×n×l;

a seventh layer is a soft threshold layer, wherein α is calculated according to the following formula, and then multiplied by data output from the first layer;

$$\alpha = \frac{1}{1 + e^{-z}}$$

wherein z represents data output from the sixth layer; and an eighth layer is an additive layer configured to add data output from the seventh layer and the data input into the first layer; and forming the deep residual neural network by an input layer, a residual layer, a softmax layer, and a classification output layer, wherein a specific training process of the neural network is as follows: using a cross entropy as an error function, using data generated by the leaky-integrator echo state network as training data of the neural network, and using an Adam optimization algorithm to update a weight of the deep residual neural network, wherein in a process of using the Adam optimization algorithm to update the weight of the deep residual neural network, if an average value within a range of consecutive specified steps is less than a specified threshold, training of the neural network is stopped and a weight that is of the deep residual neural network and calculated in the step 5 is saved;

a formula of a cross entropy function used in the training process is as follows:

$$E = -\sum_{j=1}^{N_{class}} t_j \log(y_i)$$

wherein $t_j$ represents an actual probability that an observation result belongs to category j, and $N_{class}$ represents a total quantity of classification results; and a formula of the Adam optimization algorithm in the training process is as follows:

$$x^{n+1} = x^n - \frac{\alpha}{\sqrt{\hat{v}_n + \varepsilon}} \hat{m}_n$$

$$\hat{v}_n = \frac{v_n}{1 - \beta_1^n}$$

$$\hat{m}_n = \frac{m_n}{1 - \beta_2^n}$$

$$v_n = \beta_1 v_{n-1} + (1 - \beta_1) g_n^2$$

$$m_n = \beta_2 m_{n-1} + (1 - \beta_2) g_n$$

wherein $\alpha$ represents a step size of movement, $\beta_1$ and $\beta_2$ represent two hyper-parameters, $\hat{v}_n$ represents correction of an estimated deviation from a first-order moment, $\hat{m}_n$ represents correction of an estimated deviation from a second-order moment, $\varepsilon$ represents an auxiliary constant to prevent an update collapse; $g_n$ represents a gradient of the error function, and $g_n^2$ represents a second momentum of $g_n$.

7. The transformer health state evaluation method according to claim 1, wherein step 5 specifically comprises:
performing data filtering and data cleaning on the data according to step 2, then generating an artificial data set according to step 3, and finally performing health state evaluation based on the test set in step 4, wherein if a new data category or a relevant influencing factor needs to be added, the original network is used as a pre-training model to activate all layers for training.

* * * * *